UNITED STATES PATENT OFFICE.

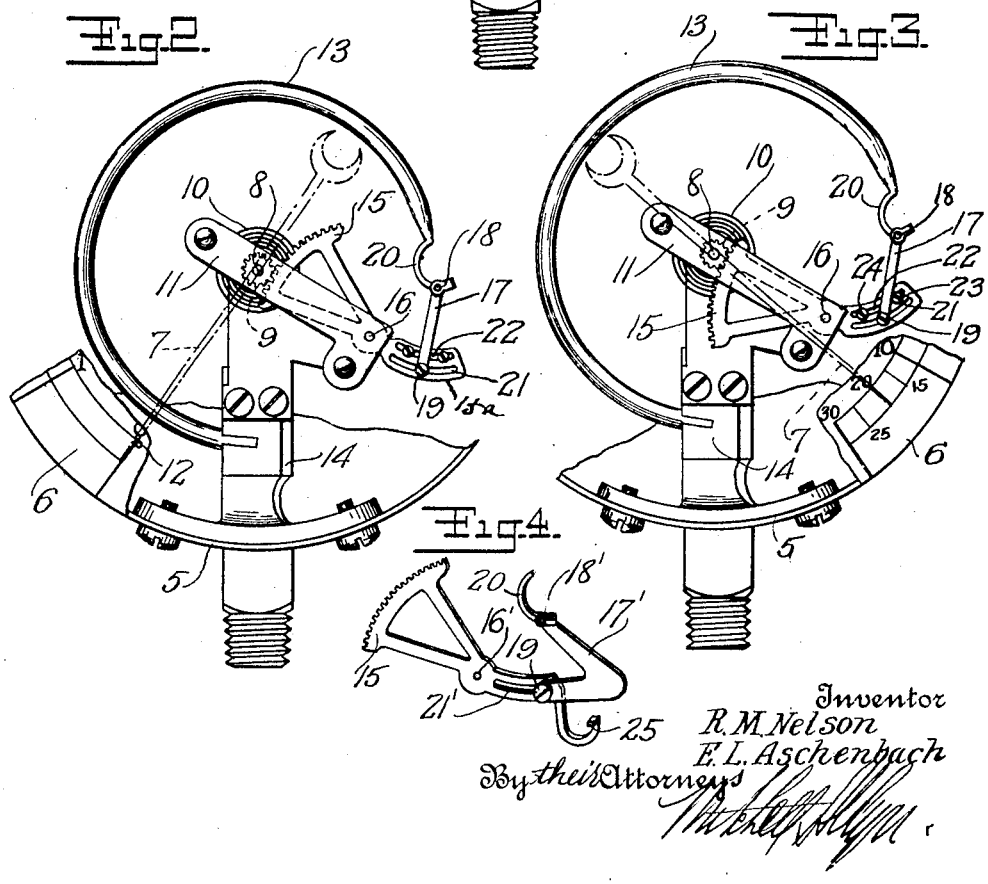

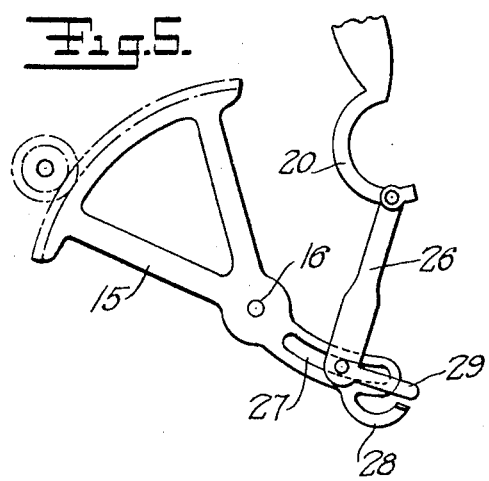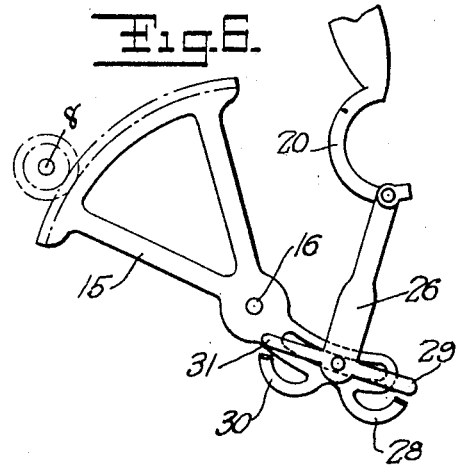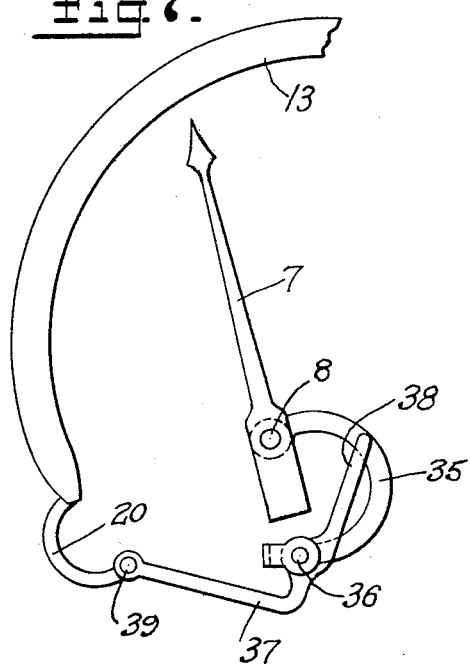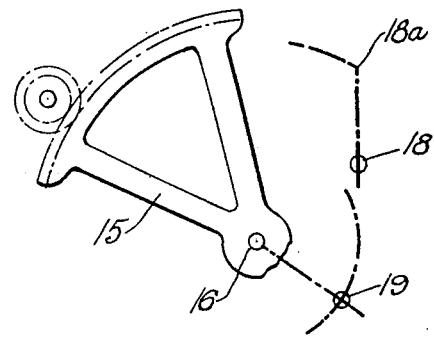

RALPH M. NELSON AND EMERSON L. ASCHENBACH, OF SELLERSVILLE, PENNSYLVANIA, ASSIGNORS TO UNITED STATES GAUGE COMPANY, OF NEW YORK, N. Y., A CORPORATION OF PENNSYLVANIA.

PRESSURE-GAGE.

1,393,155.  Specification of Letters Patent.  Patented Oct. 11, 1921.

Application filed August 24, 1920. Serial No. 405,633.

*To all whom it may concern:*

Be it known that we, RALPH M. NELSON and EMERSON L. ASCHENBACH, citizens of the United States of America, residing at Sellersville, Pennsylvania, have invented a new and useful Pressure-Gage, of which the following is a specification.

Our invention relates particularly to what is commonly termed a retard gage in which the scale readings are such that the gage may be read with great accuracy over what may be termed the normal range of movement of the pointer, and in which materially different pressures may be indicated over a smaller range of movement of the pointer.

The main object is to provide a simple and inexpensive construction which however is accurate and reliable, and which does away with the necessity of auxiliary springs or other attachments.

In its preferred form, we employ a Bourdon tube and a pointer connected thereto in such a manner that the pointer moves at one rate over the normal range of movement, and at a different rate over ranges above or below the normal range. This action is effected in the preferred form of the invention by a special link and sector connection between the tube and the pointer. Although the number and location of the parts is the same as in the usual gage construction of the non-retard type, we obtain the two different multiplying actions required of the retard gage.

Figure 1 is a front view of a gage embodying our invention.

Fig. 2 is a similar view with the casing broken away and showing the pointer in dot and dash lines in the zero or no pressure position.

Fig. 3 is a similar view showing the parts in the expanded position with the pointer in dot and dash lines indicating 20.

Fig. 4 is a perspective view of the sector and link and the adjacent connected end of the tube, showing a modified form.

Fig. 5 is a detail view of another form suitable for a pressure gage.

Fig. 6 is a detail view of the form shown in Fig. 5, showing our invention as applied in a combination pressure and vacuum gage.

Fig. 7 is a detail view embodying our invention in a gearless type of gage.

Fig. 8 is a diagrammatic view showing the relative directions of movement of the points of connection between the resilient member and the transmitting member.

The casing 5 may be of any usual construction for containing the dial 6, the pointer 7, and other parts. The pointer may be mounted detachably on the spindle 8 in the usual manner, and the latter carries a pinion 9. A spring 10 connected to the spindle and to the supporting frame 11 tends to return the pointer to the zero position where it may rest against the stop 12.

The Bourdon tube 13 of any suitable construction has one end supported by the base 14, and the other end movable as the tube expands and contracts.

The sector 15 has a pivot shaft 16 supported in the frame 11 and meshes with the pinion 9. An arm 15ª at the rear end of the sector is connected by a link 17 to the movable end of the tube so that when the tube moves the sector will move. This link is hinged at 18 to the end of the tube, and at 19 to said arm of the sector. The part 20 of the end of the tube may be bendable to permit of adjustment of the hinged point 18. The hinged connection 19 may be adjustable along the slot 21 in the arm of the sector to calibrate the instrument.

To bring about the retard action, one or more stops are provided. In the form shown in Figs. 2 and 3 the sector arm is provided with a slot 22. An adjustable stop 23 is provided in the slot to provide for the retard action when the gage is used as a pressure gage. A second adjustable stop 24 may be provided in the slot to act when the gage is used as a vacuum gage. In the form shown in said figures the end of the link 17 may be adjusted in the slot 21 to determine the extent of movement of the pointer.

When the pressure rises to the point at which the gage is set for the retard action to commence, the link 17 will contact with the stop 23 as shown in Fig. 3. After the link 17 and stop 23 are in contact with each other, the sector, link and end of the tube are locked together and move as a single unit. During the normal range of movement of the pointer and until a predetermined pressure is reached, the end of the tube is free to move in its natural direction of movement in expansion. After the end of the tube, link and arm are locked together this natural direction of movement of the end of the tube is interfered with and the end is constrained to move in an arcuate path about 16 as a center. It will be seen that a relatively much greater pressure will be required to move the end of the tube a certain distance in its constrained movement than would be required to move it the same distance in its natural direction of movement in expansion. It is therefore obvious that the movements given to the pointer for equal increments of pressure after the arm, link and tube are locked together will be much less than the movements given before the parts are locked together and the tube free to expand naturally.

When the gage is used as a vacuum gage, the tube will contract and the arm on the sector, as viewed in Figs. 2 and 3, will move downwardly until the link 17 contacts with the adjustable stop 24, after which the retard action hereinbefore described will take place.

By adjusting the stops 23 and 24 in the slot 22, the point at which the retard action begins may be varied.

In the modification shown in Fig. 4, the sector is provided with a slot 21' in which the pivot 19 may be adjusted. A stop 25 is formed on the arm of the sector and this stop contacts with the link 17' when a certain predetermined pressure has been reached. To permit adjustment, the arm carrying the stop 25 may be made bendable. Further movement of the point 18' will then be constrained to the arcuate path about the center 16' and the retard action will be similar to that described in connection with Figs. 2 and 3.

In the form shown in Fig. 5 the link 26 is preferably adjustably mounted in a slot 27 in the sector arm. The link and sector arm are provided with stops to retard the action of the sector when a predetermined pressure has been reached. In the form shown the arm is on a bendable extension 28 and the link 26 has an extension 29 for coöperating with the extension 28.

In the form shown in Fig. 6 in addition to the stops shown in Fig. 5, an additional stop extension 30 may be provided on the arm and an extension 31 may be provided on the link for coöperation with the stop 30 when denoting a vacuum.

In the forms shown in Figs. 5 and 6 when the pressure reaches a predetermined amount, the pressure reaches a predetermined amount, the stops 28 and 29 will contact with each other and the retard action will take place in a manner similar to that hereinbefore described.

When the gage is used as a vacuum gage and a certain degree of vacuum or negative pressure is attained, the stops 30 and 31 shown in Fig. 6 will contact with each other and the movement of the pointer will thereafter be retarded.

In Fig. 8 is diagrammatically shown the approximate movements of the point 18. With the parts proportioned substantially as shown in Figs. 2 and 3, the point 18 in Fig. 8 will move during the normal range of pressure away from the axis 16 until the point 18 reaches the position 18$^a$ when the stops will contact with each other. The point 18 will then be constrained to move in an arc about 16 as the center.

The retard action is due to the constrained movement of the tube and a relatively much greater pressure is required to move the pointer a certain distance when the tube is constrained in its movement.

In Fig. 7 we have shown our invention as applied to a gearless type of gage. The pointer in this instance is mounted on the spindle or column 8 in the usual manner. Mounted on the pointer or spindle 8 and movable therewith is an arm 35 corresponding to the sector arm previously described. The arm 35 may be bendable for adjustment. The end of the tube may be provided with a bendable portion 20 as in the previous forms. Pivoted to the part 20 and to the arm 35 as at 36 is a link 37. This link has what may be termed a stop or stop-arm 38 and said arm may be made bendable for adjustment if desired.

The operation of this gearless type of gage is as follows: When the tube expands the end will move in a generally left hand direction as viewed in Fig. 7. The pointer 7 will be moved by means of the arm 35 and link 37. When the tube has moved under pressure a certain distance toward the left, the stop-arm 38 will contact with the spindle 8 (in the specific form shown) after which the spindle, arm 35 and link 37 must move as a unit about the point 8 as the center, and the point 39 is of course constrained to move in an arcuate path about the center 8. This constrained movement of the tube produces the retard action as in the other forms described.

In all of the forms shown we rely for the retard action upon the resiliency of the Bourdon tube without the use of any auxiliary stop or spring device.

While we have shown and described in some detail specfic forms of our invention, we desire it to be understood that many changes and modifications may be made, all coming within the scope of the appended claims.

We claim:

1. In a gage, an indicator, an arm for moving said indicator, a Bourdon tube, a link pivotally connecting said Bourdon tube and arm, and means engaging said link when a predetermined pressure has been reached for stopping the relative movement between said arm and link whereby the latter elements will move as a unit.

2. In a gage, a Bourdon tube, an indicator, an arm for moving said indicator, means pivotally connected at opposite ends to said tube and arm and a stop engaging said means when a predetermined pressure has been reached to check the pivotal movement between said means and said arm, whereby the movement of the indicator will thereafter be retarded.

3. In a gage, a Bourdon tube, an indicator, an arm for moving said indicator, a link for adjustably and pivotally connecting the end of said tube and said arm, and coöperating stop means between said arm and link whereby said arm and link will be caused to move as a rigid unit after a predetermined pressure has been reached.

4. In a gage, a Bourdon tube, an indicator, means for moving said indicator, a link pivotally connecting said means and said tube and a stop engaging the side of said link between its ends when a predetermined pressure has been reached whereby the further expansive movement of the indicator will be thereafter retarded.

5. In a gage, a Bourbon tube, an indicator, an arm for moving said indicator, a link pivotally connecting said tube and arm, and adjustable to and fro on the latter and a stop on said arm for contacting with a part of said link when a predetermined pressure has been reached to prevent further relative movement of the arm and link as the tube continues to expand.

6. In a gage, a Bourdon tube, an indicator, an arm for moving said indicator, a link pivotally connected to said arm and tube and a stop on said arm adapted to contact with one side of said link when a predetermined pressure has been reached to check further relative movement between the link and arm whereby the movement of the indicator will be thereafter retarded.

7. In a gage, a Bourdon tube, an indicator, an arm for moving said indicator and having two slots therein, a link connected to said tube and adjustably connected to said arm by means of one of said slots and a stop in the other slot adapted to contact with a part of said link when a predetermined pressure has been reached whereby the link and arm will thereafter be moved as a unit.

8. In a gage, a Bourdon tube, an indicator, an arm for moving said indicator and having two slots therein, a link connected to said tube and adjustably connected to said arm by means of one of said slots and a pair of stops in the other slot one of which contacts with a part of said link when the pressure rises above a predetermined point and the other of which contacts with a part of said link when the pressure falls below a predetermined point whereby the movement of the indicator will be thereafter retarded.

9. In a gage, a Bourdon tube, an indicator, an arm for moving said indicator, a link pivotally connecting said arm and tube, said arm and link having coöperating stop means adapted to contact with each other for causing said arm and link to move as a unit and without relatively independent movement when the pressure rises above or falls below predetermined points.

10. In a gage, a Bourdon tube, an indicator, an arm for moving said indicator, a link pivoted to said tube and arm, and stop means between said arm and link adapted to check independent relative movement between said arm and link when a predetermined pressure has been reached.

11. In a gage, a Bourdon tube, an indicator, an arm for moving said indicator, a link pivotally connecting said tube and arm, and a stop with which a part of said link is adapted to coact when a predetermined pressure has been reached whereby said link and arm may thereafter move as a unit and without relatively independent movement.

RALPH M. NELSON.
EMERSON L. ASCHENBACH.